(12) United States Patent
Takatsu et al.

(10) Patent No.: US 8,444,945 B2
(45) Date of Patent: May 21, 2013

(54) METHOD FOR REMOVING SULFUR COMPOUND IN HYDROCARBON-CONTAINING GAS

(75) Inventors: Kozo Takatsu, Chiba (JP); Gakuji Takegoshi, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 671 days.

(21) Appl. No.: 10/540,881

(22) PCT Filed: Dec. 24, 2003

(86) PCT No.: PCT/JP03/16596
§ 371 (c)(1),
(2), (4) Date: Jan. 18, 2006

(87) PCT Pub. No.: WO2004/058927
PCT Pub. Date: Jul. 15, 2004

(65) Prior Publication Data
US 2006/0108262 A1 May 25, 2006

(30) Foreign Application Priority Data

Dec. 26, 2002 (JP) .................. 2002-376531

(51) Int. Cl.
*B01D 53/48* (2006.01)
(52) U.S. Cl.
USPC ............... 423/244.11; 208/179; 208/208 R
(58) Field of Classification Search
USPC ................... 208/189; 423/244.11
See application file for complete search history.

(56) References Cited

U.S. PATENT DOCUMENTS

| | | | | |
|---|---|---|---|---|
| 3,945,943 A | * | 3/1976 | Ward | 502/66 |
| 4,478,800 A | * | 10/1984 | van der Wal et al. | 423/230 |
| 4,971,682 A | | 11/1990 | Clark | |
| 5,146,039 A | | 9/1992 | Wildt et al. | |
| 5,882,614 A | | 3/1999 | Taylor, Jr. et al. | |
| 2001/0014304 A1 | * | 8/2001 | Satokawa et al. | 423/244.11 |
| 2002/0157990 A1 | * | 10/2002 | Feimer et al. | 208/243 |
| 2002/0159939 A1 | | 10/2002 | Lieftink et al. | |

FOREIGN PATENT DOCUMENTS

| | | |
|---|---|---|
| EP | 1881056 | 1/2008 |
| JP | 03-033191 | 2/1991 |
| JP | 06-287575 | 10/1994 |
| JP | 2001-278602 | 10/2001 |
| JP | 2001-279257 | 10/2001 |
| JP | 2001-279261 | 10/2001 |
| JP | 2002-316043 | 10/2002 |
| JP | 2002-322482 | 11/2002 |
| JP | 2002-363574 | 12/2002 |
| JP | 2003-020489 | 1/2003 |
| WO | 01/72417 | 10/2001 |
| WO | 02/38268 | 5/2002 |

* cited by examiner

*Primary Examiner* — Prem C Singh
*Assistant Examiner* — Michelle Stein
(74) *Attorney, Agent, or Firm* — Oblon, Spivak, McClelland, Maier & Neustadt, L.L.P.

(57) ABSTRACT

A method for removing sulfur compounds from a hydrocarbon-containing gas wherein the gas is fed to a desulfurizing bed comprising a desulfurizing agent A comprising zeolite and a desulfurizing agent B comprising at least one selected from the group consisting of a metal element, a metal oxide and a metal component-carried oxide, is provided. Hydrogen for a fuel cell is produced by a method, wherein the gas obtained by the described desulfurization method is contacted with a partial oxidation reforming catalyst, an autothermal reforming catalyst or a steam reforming catalyst.

14 Claims, No Drawings

METHOD FOR REMOVING SULFUR COMPOUND IN HYDROCARBON-CONTAINING GAS

BACKGROUND OF THE INVENTION

The present invention relates to a hydrocarbon-containing gas for a fuel cell having a low content of carbonyl sulfide (COS), a method for removing sulfur compounds contained in a hydrocarbon-containing gas and a production process for hydrogen for a fuel cell. More specifically, the present invention relates to a method for efficiently removing all of sulfur compounds contained in a hydrocarbon-containing gas to a low concentration even at a room temperature and a process for reforming the desulfurization-treated hydrocarbon-containing gas obtained by the method described above to economically advantageously produce hydrogen for a fuel cell.

RELATED ART

In recent years, new energy technologies are spotlighted because of environmental problems, and attentions are paid on a fuel cell as one of the above new energy technologies. In this fuel cell, hydrogen is electrochemically reacted with oxygen to thereby convert chemical energy to electrical energy, and it is characterized by that it has a high use efficiency of energy and has positively been researched for putting to practical use for civil requirement, industries or automobiles.

In the above fuel cell, types such as a phosphoric acid type, a melt carbonate type, a solid oxide type and a solid polymer type are known according to the kinds of electrolytes used. On the other hand, methanol, liquefied natural gas comprising principally methane, city gas comprising the above natural gas as a principal component, synthetic liquid fuel using natural gas as a raw material and petroleum base hydrocarbons such as LPG, naphtha and kerosene of a petroleum base are researched to be used as the hydrogen source.

When the above gaseous or liquid hydrocarbons are used to produce hydrogen, usually used is a method in which the above hydrocarbons are treated by partial oxidation reforming, autothermal reforming or steam reforming in the presence of a reforming catalyst.

When LPG and city gas are reformed to produce hydrogen for a fuel cell, a sulfur content in the gases is required to be reduced in order to inhibit a reforming catalyst from being poisoned. Further, when propylene and butene are used as raw materials for petrochemical products, a sulfur content is required to be reduced as well in order to inhibit a catalyst from being poisoned. Further, LPG having as small sulfur content as possible is preferably used in order to allow the performance of a desulfurizing agent to be exhibited to the utmost.

To analyze sulfur compounds contained in LPG described above in detail, dimethyl sulfide (DMS), t-butylmercaptan (TBM) and methyl ethyl sulfide (MES) which are added as odorants are usually contained therein in addition to methylmercaptan and carbonyl sulfide. Various adsorbents for adsorbing and removing the above sulfur contents from fuel gas such as LPG are known. However, it used to be the existing situation that some of these adsorbents show a high desulfurizing performance at about 150 to 300° C. but do not necessarily have a satisfactory desulfurizing performance at a room temperature.

Disclosed are, for example, a desulfurizing agent obtained by carrying Ag, Cu, Zn, Fe, Co and Ni on hydrophobic zeolite by ion exchange (Japanese Patent Application Laid-Open No. 286753/2001) and a desulfurizing agent obtained by carrying Ag or Cu on Y type zeolite, β type zeolite or X type zeolite (Japanese Patent Application Laid-Open No. 305123/2001). However, it has been found that the above desulfurizing agents can efficiently adsorb and remove mercaptans and sulfides at a room temperature but scarcely adsorb carbonyl sulfide.

On the other hand, a copper-zinc base desulfurizing agent is disclosed (Japanese Patent Application Laid-Open No. 302496/1990). However, the above desulfurizing agent can adsorb and remove various sulfur compounds including carbonyl sulfide at a temperature of 150° C. or higher but has a low adsorbing performance to sulfur compounds at a low temperature of 100° C. or lower. Further, a desulfurizing agent obtained by carrying copper on a porous carrier such as alumina is disclosed (Japanese Patent Application Laid-Open No. 123188/2001). It is described that the above desulfurizing agent can be used even at a low temperature of 100° C. or lower, but the adsorbing performance is not sufficiently satisfactory.

DISCLOSURE OF THE INVENTION

The present invention has been made under the situations described above, and an object of the present invention is to provide a method for readily and efficiently removing all of sulfur compounds contained in a hydrocarbon-containing gas to a low concentration even at a room temperature and a process for reforming a desulfurization-treated hydrocarbon-containing gas obtained by the method described above to economically advantageously produce hydrogen for a fuel cell.

Intensive researches repeated by the present inventors in order to achieve the object described above have resulted in finding that all of sulfur compounds contained in a hydrocarbon-containing gas can efficiently be removed to a low concentration even at a room temperature by using a compound having a content of carbonyl sulfide which is low to the utmost as a hydrocarbon-containing gas and using two kinds of desulfurizing agents having different desulfurizing performances in combination in a desulfurizing bed to feed a hydrocarbon-containing gas and that hydrogen for a fuel cell is economically advantageously obtained by subjecting the above desulfurization-treated hydrocarbon-containing gas to various reforming treatments. The present invention has been completed based on such knowledge.

That is, the present invention provides:
(1) a method for removing sulfur compounds contained in a hydrocarbon-containing gas, wherein in feeding a hydrocarbon-containing gas to a desulfurizing bed to remove sulfur compounds contained in the above gas, the desulfurizing bed described above is constituted from a desulfurizing agent A comprising zeolite and a desulfurizing agent B comprising at least one selected from a metal element, a metal oxide and a metal component-carried oxide,
(2) the method for removing sulfur compounds contained in a hydrocarbon-containing gas as described in the above item (1), wherein the desulfurizing agent A has a higher desulfurizing performance to sulfides and disulfides than that of the desulfurizing agent B, and the desulfurizing agent B has a higher desulfurizing performance to carbonyl sulfide than that of the desulfurizing agent A,
(3) the method for removing sulfur compounds contained in a hydrocarbon-containing gas as described in the above item (1) or (2), wherein a volume ratio of the desulfurizing agent A to the desulfurizing agent B in the desulfurizing bed is 0.1:0.9 to 0.9:0.1, (4) the method for removing sulfur compounds contained in a hydrocarbon-containing gas as described in any of the above items (1) to (3), wherein zeolite in the desulfurizing agent A has a beta (BEA) and/or faujasite (FAU) structure, (5) the method for removing sulfur compounds contained in a hydrocarbon-containing gas as described in any of the above items (1) to (4), wherein the desulfurizing agent A is a desulfurizing agent comprising, in addition to zeolite, at least one metal component selected from Ag, Cu, Ni, Zn, Mn, Fe, Co, alkaline metals, alkaline earth metals and rare earth metals, (6) the method for removing sulfur compounds contained in a hydrocarbon-containing gas as described in any of the above items (1) to (5), wherein the desulfurizing agent B is a desulfurizing agent comprising at least one metal component selected from Ag, Cu, Ni, Zn, Mn, Fe, Co, Al, Si, alkaline metals, alkaline earth metals and rare earth metals, (7) the method for removing sulfur compounds contained in a hydrocarbon-containing gas as described in any of the above items (1) to (6), wherein a temperature of the desulfurizing bed is −20 to 100° C., (8) a hydrocarbon-containing gas for a fuel cell containing 0.1 weight ppm or less of carbonyl sulfide, (9) the hydrocarbon-containing gas for a fuel cell as described in the above item (8), wherein it is at least one selected from natural gas, city gas, LPG, a naphtha fraction and dimethyl ether,

(10) a method for removing sulfur compounds contained in a hydrocarbon-containing gas, wherein a desulfurizing agent comprising at least zeolite is used to remove sulfur compounds contained in the hydrocarbon-containing gas for a fuel cell as described in the above item (8) or (9),

(11) a production process of hydrogen for a fuel cell, wherein sulfur compounds contained in a hydrocarbon-containing gas are removed by the method as described in any of the above items (1) to (7) and (10), and then the desulfurization-treated hydrocarbon-containing gas is brought into contact with a partial oxidation reforming catalyst, an autothermal reforming catalyst or a steam reforming catalyst,

(12) the production process of hydrogen for a fuel cell as described in the above item (11), wherein the partial oxidation reforming catalyst, the autothermal reforming catalyst or the steam reforming catalyst is a ruthenium base or nickel base catalyst,

(13) a production process of hydrogen for a fuel cell, characterized by using the hydrocarbon-containing gas as described in the above item (8) or (9) as a raw material,

(14) a production process of hydrogen for a fuel cell, wherein sulfur compounds contained in the hydrocarbon-containing gas as described in the above item (8) or (9) are removed, and then the desulfurization-treated hydrocarbon-containing gas is brought into contact with a partial oxidation reforming catalyst, an autothermal reforming catalyst or a steam reforming catalyst, and

(15) the production process of hydrogen for a fuel cell as described in the above item (14), wherein the partial oxidation reforming catalyst, the autothermal reforming catalyst or the steam reforming catalyst is a ruthenium base or nickel base catalyst.

BEST MODE FOR CARRYING OUT THE INVENTION

The present invention shall be explained below in further details.

The method of the present invention for removing sulfur compounds contained in a hydrocarbon-containing gas is a method in which a hydrocarbon-containing gas is fed to a desulfurizing bed to remove sulfur compounds contained in the above gas, and the combination of a desulfurizing agent A and a desulfurizing agent B each shown below is used as a desulfurizing agent constituting the desulfurizing bed described above.

The desulfurizing agent A used in the removing method of the present invention is a desulfurizing agent comprising zeolite and has a desulfurizing performance to mercaptans, sulfides, disulfides and thiophenes contained in a hydrocarbon-containing gas, but it has a low desulfurizing performance to carbonyl sulfide.

Zeolite having a beta (BEA) and/or faujasite (FAU) structure in the above desulfurizing agent A is preferred in terms of a performance. For example, f type, X type and Y type zeolites can be given as zeolite having the above structure. Only one kind of them may be used alone or they may be used in combination of two or more kinds thereof.

The above desulfurizing agent A comprises preferably, in addition to zeolite, at least one metal component selected from Ag, Cu, Ni, Zn, Mn, Fe, Co, alkaline metals, alkaline earth metals and rare earth metals. In this case, the alkaline metals include potassium and sodium; the alkaline earth metals include calcium and magnesium; and the rare earth metals include lanthanum and cerium.

Among the metal components described above, Ag and/or Cu are particularly preferred, and the desulfurizing agent A comprising the metal component in addition to zeolite can be prepared by a method in which the above metal component is carried on zeolite. To be specific, an aqueous solution containing a water-soluble compound of the intended metal is brought into contact with zeolite by a stirring method, an impregnating method or a flow method, and then zeolite is washed with water, followed by drying and subjecting to calcination treatment, whereby the desulfurizing agent A is obtained.

A content of the metal component contained in the desulfurizing agent A thus obtained falls in a range of usually 1 to 40 mass %, preferably 5 to 30 mass % in terms of the metal.

On the other hand, the desulfurizing agent B is a desulfurizing agent comprising at least one selected from a metal element, a metal oxide and a metal component-carried oxide, and it has a relatively good desulfurizing performance to carbonyl sulfide contained in a hydrocarbon-containing gas, but it has a lower desulfurizing performance to sulfides and disulfides than that of the desulfurizing agent A.

The above desulfurizing agent B is preferably a desulfurizing agent comprising at least one metal component selected from Ag, Cu, Ni, Zn, Mn, Fe, Co, Al, Si, alkaline metals, alkaline earth metals and rare earth metals. In this case, the alkaline metals include potassium and sodium; the alkaline earth metals include calcium and magnesium; and the rare earth metals include lanthanum and cerium.

The above desulfurizing agent B is preferably a desulfurizing agent obtained by carrying the respective metal components on a porous inorganic oxide carrier, and the desulfurizing agent carried thereon with at least one of Ag, Cu and Ni is particularly suited. The respective metal components can be carried by a conventional method such as a coprecipitation method and an impregnation method. Cerium can be carried as the metal component on the porous inorganic oxide carrier, and even cerium oxide alone exhibits a good desulfurizing performance. Further, at least one of the metal components described above may be carried on cerium oxide which is used as a carrier.

Capable of being given as the porous inorganic oxide carrier described above are, for example, silica, alumina, silica-alumina, titania, zirconia, zeolite, magnesia, diatomaceous earth, white clay, clay and zinc oxide. They may be used alone or in combination of two or more kinds thereof. Among them, an alumina carrier and a silica-alumina carrier are preferred.

A method for preparing an Ni—Cu base desulfurizing agent using suited silica-alumina as a carrier as the desulfurizing agent B shall be explained below.

In the above desulfurizing agent B, a content of the total metals carried (reduced to oxide) falls usually in a range of 5 to 90 mass %, and a content of the carrier falls preferably in a range of 95 to 10 mass % in terms of a desulfurizing performance and a mechanical strength of the desulfurizing agent. The foregoing content of the total metals (reduced to oxide) is preferably 40 to 90 mass %, more preferably 70 to 90 mass % when carried by a coprecipitation method, and it is preferably 5 to 40 mass % when carried by an impregnation method.

First, prepared are an acid aqueous solution or water dispersion containing a nickel source, a copper source and an aluminum source and a basic aqueous solution containing a silicon source and an inorganic base. The nickel source used for the former acid aqueous solution or water dispersion includes, for example, nickel chloride, nickel nitrate, nickel sulfate, nickel acetate, nickel carbonate and hydrates thereof, and the copper source includes, for example, copper chloride, copper nitrate, copper sulfate, copper acetate and hydrates thereof. The above nickel sources and copper sources each may be used alone or in combination of two or more kinds thereof.

The aluminum source includes alumina hydrates such as pseudo boehmite, boehmite alumina, bayerite and gibbsite and γ-alumina. Among them, pseudo boehmite, boehmite alumina and γ-alumina are suited. They can be used in the form of powder or sol. The above aluminum sources may be used alone or in combination of two or more kinds thereof.

On the other hand, the silicon source used for the basic aqueous solution shall not specifically be restricted as long as it is soluble in an alkaline aqueous solution and becomes silica by calcination, and it includes, for example, orthosilicic acid, metasilicic acid, sodium salts and potassium salts thereof and water glass. They may be used alone or in combination of two or more kinds thereof. Water glass which is a kind of sodium silicate hydrate is particularly suited.

Carbonates and hydroxides of alkaline metals are preferred as the inorganic base, and it includes, for example, sodium carbonate, potassium carbonate, sodium hydroxide and potassium hydroxide. They may be used alone or in combination of two or more kinds thereof, and sodium carbonate alone or the combination of sodium carbonate and sodium hydroxide is particularly suited. A use amount of the above inorganic base is advantageously selected so that when the acid aqueous solution or water dispersion is mixed with the above basic aqueous solution in the subsequent step, the mixed solution becomes neutral or basic substantially.

The whole amount of the above inorganic base may be used for preparing the above basic aqueous solution or a part thereof may be added to the mixed solution of the acid aqueous solution or water dispersion described above and the basic aqueous solution in the subsequent step.

The acid aqueous solution or water dispersion and the basic aqueous solution which are prepared in the manners described above each are heated to 50 to 90° C., and then both are mixed. This mixing is preferably carried out as soon as possible. After mixing, an aqueous solution containing an inorganic base which is heated to 50 to 90° C. is added if necessary, and then the mixed solution is stirred at a temperature of 50 to 90° C. for 0.5 to 3 hours to complete the reaction.

Next, the solid matter produced is sufficiently washed and then subjected to solid-liquid separation, or after subjecting the solid matter produced to solid-liquid separation, it is sufficiently washed, and then this solid matter is subjected to drying treatment at a temperature of 80 to 150° C. by a publicly known method. The drying-treated matter thus obtained is calcined at a temperature falling in a range of preferably 200 to 400° C., whereby obtained is the desulfurizing agent B in which nickel and copper are carried on a silica-alumina carrier. If the calcination temperature deviates from the range described above, an Ni—Cu base desulfurizing agent having the desired performance is less liable to be obtained.

Next, a method for preparing a silver-carried desulfurizing agent comprising alumina as a carrier which is suited as the desulfurizing agent B shall be explained.

A carrying amount of silver falls preferably in a range of 5 to 30 mass % from the viewpoint of the desulfurizing performance. An aqueous solution containing the silver source is prepared. The silver source includes, for example, silver nitrate, silver acetate and silver sulfate. These silver sources may be used alone or in combination. Alumina includes aluminas of a γ type, a φ type, a χ type, a δ type and a η type, and the γ type, the χ type and the η type are preferably used. An aqueous solution containing the silver source described above is impregnated into alumina and carried, and it is dried at a temperature of 80 to 150° C. and then calcined at a temperature of 200 to 400° C., whereby obtained is the desulfurizing agent B in which silver is carried on an alumina carrier.

Next, a method for preparing a desulfurizing agent comprising cerium oxide which is suited as the desulfurizing agent B shall be explained.

For example, when producing the desulfurizing agent comprising cerium oxide alone, an aqueous solution containing a cerium source, to be specific, nitrate salt of cerium is brought into contact with an alkaline aqueous solution to produce a precipitate, and then the above precipitate is filtered, washed with water, dried at a temperature of 50 to 200° C. and then subjected to calcination treatment at a temperature of 250 to 500° C. Then, it is molded by tableting molding and further crashed so that the desired particle diameter is obtained.

Cerium oxide can be carried on a refractory porous carrier using a publicly known method, for example, a pore filling method, a dipping method and an evaporation-to-dryness method. In this case, the drying temperature is usually 50 to 200° C., and the calcination temperature is 250 to 500° C.

Further, the same publicly known method as described above, for example, a pore filling method, a dipping method and an evaporation-to-dryness method can be adopted for carrying the active metal specie described above on a carrier comprising cerium oxide. In this case, the drying temperature is usually 50 to 200° C., and the calcination temperature is preferably 400° C. or lower and falls more preferably in a range of 100 to 400° C.

When comparing a desulfurizing performance of the desulfurizing agent A described above with that of the desulfurizing agent B, the desulfurizing agent A has usually a higher desulfurizing performance to sulfides and disulfides than that of the desulfurizing agent B, and the desulfurizing agent B has a higher desulfurizing performance to carbonyl sulfide than that of the desulfurizing agent A.

In the method of the present invention for removing sulfur compounds, the combination of the desulfurizing agent A and the desulfurizing agent B each described above is used as the desulfurizing agent constituting the desulfurizing bed, and in respect to a use proportion thereof, a volume ratio of the desulfurizing agent A to the desulfurizing agent B falls preferably in a range of 0.1:0.9 to 0.9:0.1. If the above volume ratio deviates from the range described above, it is difficult to sufficiently reduce all the sulfur compounds contained in a hydrocarbon-containing gas at a room temperature, and the object of the present invention shall not be achieved in a certain case. More preferred range of the above volume ratio is 0.2:0.8 to 0.8:0.2.

In the present invention, a hydrocarbon-containing gas for a fuel cell containing 0.1 weight ppm or less of carbonyl sulfide is preferably used as the raw material gas for the purpose of removing all the sulfur compounds contained in the hydrocarbon-containing gas for a fuel cell. That is, usually contained in LPG are various sulfur compounds in addition to trace amounts of sulfur components which are not removed in a crude oil-refining step, for example, methylmercaptan and carbonyl sulfide. When reforming LPG and city gas to produce hydrogen for a fuel cell, the above sulfur components are required to be reduced to the utmost in order to prevent the catalyst from being poisoned as described above. Further, LPG having as small sulfur content as possible is preferably used in-order to exhibit a performance of the desulfurizing agent used to the maximum, and in order to achieve the above matter, preferably used is LPG in which a content of carbonyl sulfide less liable to be desulfurized as compared with other sulfur compounds is as small as possible. From such point of view, a hydrocarbon-containing gas for a fuel cell containing 0.1 weight ppm or less of carbonyl sulfide is preferably used in the present invention, and the hydrocarbon-containing gas for a fuel cell containing 0.07 weight ppm (0.1 mass ppm) or less of carbonyl sulfide is more preferably used. The satisfactory desulfurizing effect can be obtained by using the desulfurizing agent A described above alone as the desulfurizing agent.

The hydrocarbon-containing gas to which the method of the present invention for removing sulfur compounds is applied includes, for example, LPG, natural gas, city gas, a naphtha fraction, dimethyl ether and gases containing at least one selected from ethane, ethylene, propane, propylene and butane, and among them, LPG, natural gas, city gas, a naphtha fraction or dimethyl ether is preferred.

In respect to the desulfurizing conditions, the temperature is selected usually in a range of −20 to 100° C., and GHSV (gas hourly space velocity) is selected in a range of 100 to 1,000,000 $h^{-1}$, preferably 100 to 100,000 $h^{-1}$ and more preferably 100 to 30,000 $h^{-1}$.

Next, in the production process of the present invention for hydrogen for a fuel cell, the sulfur compounds contained in the hydrocarbon-containing gas are subjected to desulfurization treatment by the method of the present invention for removing sulfur compounds, and then the desulfurization-treated hydrocarbon-containing gas is brought into contact with a partial oxidation reforming catalyst, an autothermal reforming catalyst or a steam reforming catalyst, whereby the gas is subjected to partial oxidation reforming, autothermal reforming or steam reforming to produce hydrogen.

In the above reforming treatment, a concentration of the sulfur compounds contained in the desulfurization-treated hydrocarbon-containing gas is preferably 0.05 weight ppm or less, particularly preferably 0.02 weight ppm or less in terms of a life of the respective reforming catalysts.

The partial oxidation reforming described above is a method for producing hydrogen by partial oxidation reaction of hydrocarbon, and the reforming reaction is carried out usually on the conditions of a reaction pressure of atmospheric pressure to 5 MPa, a reaction temperature of 400 to 1,100° C., a GHSV of 1,000 to 100,000 $h^{-1}$ and an oxygen ($O_2$)/carbon mole ratio of 0.2 to 0.8 in the presence of the partial oxidation reforming catalyst.

The autothermal reforming is a method in which partial oxidation reforming is combined with steam reforming, and the reforming reaction is carried out usually on the conditions of a reaction pressure of atmospheric pressure to 5 MPa, a reaction temperature of 400 to 1,100° C., an oxygen ($O_2$)/carbon mole ratio of 0.1 to 1, a steam/carbon mole ratio of 0.1 to 10 and a GHSV of 1,000 to 100,000 $h^{-1}$ in the presence of the autothermal reforming catalyst.

Further, the steam reforming is a method in which hydrocarbon is brought into contact with steam to produce hydrogen, and the reforming reaction is carried out usually on the conditions of a reaction pressure of atmospheric pressure to 3 MPa, a reaction temperature of 200 to 900° C., a steam/carbon mole ratio of 1.5 to 10 and a GHSV of 1,000 to 100,000 $h^{-1}$ in the presence of the steam reforming catalyst.

In the present invention, the partial oxidation reforming catalyst, the autothermal reforming catalyst and the steam reforming catalyst each described above can be used suitably selecting from publicly known respective catalysts, and ruthenium base and nickel base catalysts are particularly suited. A carrier containing at least one selected from manganese oxide, cerium oxide and zirconia can preferably be given as the carrier used for the above catalysts. The above carrier may be a carrier comprising only the above metal oxides or may be a carrier prepared by allowing the metal oxides described above to be contained in a refractory porous inorganic oxide such as alumina.

Next, the present invention shall be explained in further details with reference to examples, but the present invention shall by no means be restricted by these examples.

Example 1

A product 20 g obtained by calcining β type zeolite (HSZ-930NHA, manufactured by Tosoh Corp.) at 500° C. was added to an aqueous solution prepared by dissolving 3.5 g of silver nitrate (extra pure grade, manufactured by Wako Pure Chemical Industries, Ltd.) in 100 ml of water, and the mixture was stirred for 4 hours to carry out ion exchange. Thereafter, the solid matter was washed with water and then filtered, and it was dried at 120° C. for 12 hours by means of a blower and subjected to calcination treatment at 400° C. for 3 hours, whereby a desulfurizing agent A containing 6 mass % of Ag was obtained.

On the other hand, 730.2 g of nickel sulfate hexahydrate (extra pure grade, manufactured by Wako Pure Chemical Industries, Ltd.) and 151.3 g of copper sulfate pentahydrate (extra pure grade, manufactured by Wako Pure Chemical Industries, Ltd.) were dissolved in 8 liters of water heated to 80° C., and 16.0 g of pseudo boehmite (C-AP, 67 mass % in terms of $Al_2O_3$, manufactured by Catalysts & Chemicals Ind. Co., Ltd.) was mixed therewith. Then, 300 ml of a sulfuric acid aqueous solution having a concentration of 0.5 mole/liter was added thereto to control a pH to 2 (preparation liquid A). Further, 600.0 g of sodium carbonate was dissolved in 8 liters of water heated to 80° C., and 180.2 g of water glass (No. J-1, Si concentration: 29 mass %, manufactured by Nippon Chemical Industry Co., Ltd.) was added thereto (preparation liquid B). The preparation liquid A and the preparation liquid B each described above were mixed while maintaining each at 80° C., and the mixture was stirred for one hour. Thereafter, the precipitated cake was washed with 60 liters of water and then filtered, and it was dried at 120° C. for 12 hours by means of a blast dryer and further subjected to calcination treatment at 350° C. for 3 hours, whereby a desulfurizing agent B containing 65 mass % of Ni and 15 mass % of Cu was obtained.

Next, the desulfurizing agent A and the desulfurizing agent B thus obtained each were molded to 0.5 to 1 mm and charged into a desulfurizing tube having an inner diameter of 9 mm, wherein 0.5 cm³ of the desulfurizing agent A was charged in an upper stream side, and 0.5 cm³ of the desulfurizing agent B was charged in a downstream side, and the following performance test of the desulfurizing agents was carried out.

<Performance Test of the Desulfurizing Agents>

A temperature of the desulfurizing agent was set to 20° C., and propane gas containing each 10 vol ppm (total 40 vol ppm) of carbonyl sulfide (COS), dimethyl sulfide (DMS), t-butylmercaptan (TBM) and dimethyl disulfide (DMDS) was allowed to flow on the conditions of atmospheric pressure and a GHSV (gas hourly space velocity) of 30,000 h$^{-1}$.

The concentrations of the respective sulfur compounds contained in the gas in the outlet of the desulfurizing tube were measured every one hour by SCD (sulfur chemiluminescent detector) gas chromatography. Time in which the concentrations of the respective sulfur compounds exceeded 0.07 weight ppm (0.1 vol ppm) were shown in Table 1.

Example 2

The same operation as in Example 1 was carried out, except that in Example 1, 0.5 cm³ of the desulfurizing agent B was charged in an upper stream side and that 0.5 cm³ of the desulfurizing agent A was charged in a downstream side. The performance test result of the desulfurizing agents is shown in Table 1.

Example 3

The same operation as in Example 1 was carried out, except that in Example 1, 0.3 cm³ of the desulfurizing agent A was charged in an upper stream side and that 0.7 cm³ of the desulfurizing agent B was charged in a downstream side. The performance test result of the desulfurizing agents is shown in Table 1.

Example 4

The same operation as in Example 1 was carried out, except that in Example 1, 1.0 cm³ of the mixture of 0.5 cm³ of the desulfurizing agent A and 0.5 cm³ of the desulfurizing agent B was charged. The performance test result of the desulfurizing agents is shown in Table 1.

Example 5

Alumina (KHD-24, manufactured by Sumitomo Chemical Co., Ltd.) was crashed, and 20 g thereof was weighed. An aqueous solution prepared by dissolving 7.9 g of silver nitrate (extra pure grade, manufactured by Wako Pure Chemical Industries, Ltd.) in 12 ml of water was added thereto, impregnated and carried. Thereafter, the solid matter was dried at 60° C. for 3 hours and at 120° C. for 12 hours by means of a blast dryer and then subjected to calcination treatment at 400° C. for 3 hours, whereby a desulfurizing agent B containing 16 mass % of Ag was obtained. The same operation as in Example 1 was carried out, except that the desulfurizing agent B containing Ag was charged in place of the desulfurizing agent B containing Ni and Cu prepared in Example 1. The performance test result of the desulfurizing agents is shown in Table 1.

Example 6

A solution prepared by dissolving 470 g of cerium nitrate hexahydrate (reagent extra pure grade, manufactured by Wako Pure Chemical Industries, Ltd.) in 1 liter of ion-exchanged water heated to 50° C. and an NaOH aqueous solution having a concentration of 3 mole/l were dropwise added and mixed so that the mixed solution was maintained at a pH of 13, and this mixed solution was stirred for one hour while maintaining at 50° C.

Next, a solid matter produced was filtered and washed with 20 liters of ion-exchanged water, and then the product was dried at 110° C. for 12 hours by means of a blast dryer and further subjected to calcination treatment at 350° C. for 3 hours, whereby a desulfurizing agent B comprising cerium was obtained. The same operation as in Example 1 was carried out, except that the desulfurizing agent B comprising cerium was charged in place of the desulfurizing agent B containing Ni and Cu prepared in Example 1. The performance test result of the desulfurizing agents is shown in Table 1.

Example 7

Cerium oxide obtained in Example 6 was impregnated with a nickel nitrate aqueous solution, and it was dried at 110° C. for 12 hours and further subjected to calcination treatment at 400° C. for 3 hours, whereby a desulfurizing agent B carried thereon with 10 mass % of Ni based on the whole amount was obtained. The same operation as in Example 1 was carried out, except that the desulfurizing agent B comprising cerium was charged in place of the desulfurizing agent B containing Ni and Cu prepared in Example 1. The performance test result of the desulfurizing agent is shown in Table 1.

Example 8

Cerium oxide obtained in Example 6 was impregnated with a silver nitrate aqueous solution, and it was dried at 110° C. for 12 hours and further subjected to calcination treatment at 400° C. for 3 hours, whereby a desulfurizing agent B carried thereon with 10 mass % of Ag based on the whole amount was obtained. The same operation as in Example 1 was carried out, except that the desulfurizing agent B comprising cerium was charged in place of the desulfurizing agent B containing Ni and Cu prepared in Example 1. The performance test result of the desulfurizing agent is shown in Table 1.

Example 9

Nickel sulfate hexahydrate 360.1 g (extra pure grade, manufactured by Wako Pure Chemical Industries, Ltd.) and 85.2 g of copper sulfate pentahydrate (extra pure grade, manufactured by Wako Pure Chemical Industries, Ltd.) were dissolved in 4 liters of ion-exchanged water heated to 80° C., and 7.2 g of pseudo boehmite (C-AP, 67 mass % in terms of $Al_2O_3$, manufactured by Catalysts & Chemicals Ind. Co., Ltd.) was mixed therewith (preparation liquid A).

On the other hand, 300.0 g of sodium carbonate was dissolved in 4 liters of ion-exchanged water heated to 80° C., and 93.6 g of water glass (No. J-1, Si concentration: 29 mass %, manufactured by Nippon Chemical Industry Co., Ltd.) was added thereto (preparation liquid B).

Next, the preparation liquid A and the preparation liquid B each described above were mixed while maintaining each at 80° C., and the mixture was stirred for one hour. Thereafter, the precipitated cake was washed with 60 liters of ion-exchanged water and then filtered, and it was dried at 120° C. for 12 hours by means of a blast dryer. Then, it was subjected to calcination treatment at 350° C. for 3 hours, whereby a desulfurizing agent B containing 16 mass % of CuO, 64 mass % of NiO and 20 mass % of $SiO_2.Al_2O_3$ was obtained.

The same operation as in Example 1 was carried out, except that the above desulfurizing agent B was charged in place of the desulfurizing agent B containing Ni and Cu prepared in Example 1. The performance test result of the desulfurizing agent is shown in Table 1.

Example 10

A desulfurizing agent B containing 4 mass % of CuO, 76 mass % of NiO and 20 mass % of $SiO_2.Al_2O_3$ was obtained in the same manner as in Example 9, except that in Example 9, 427.6 g of nickel sulfate hexahydrate and 21.3 g of copper sulfate pentahydrate were used. The same operation as in Example 1 was carried out, except that the above desulfurizing agent B was charged in place of the desulfurizing agent B containing Ni and Cu prepared in Example 1. The performance test result of the desulfurizing agent is shown in Table 1.

Example 11

A desulfurizing agent B containing 1 mass % of CuO, 79 mass % of NiO and 20 mass % of $SiO_2.Al_2O_3$ was obtained in the same manner as in Example 9, except that in Example 9, 444.5 g of nickel sulfate hexahydrate and 5.3 g of copper sulfate pentahydrate were used. The same operation as in Example 1 was carried out, except that the above desulfurizing agent B was charged in place of the desulfurizing agent B containing Ni and Cu prepared in Example 1. The performance test result of the desulfurizing agent is shown in Table 1.

Example 12

A desulfurizing agent B containing 40 mass % of CuO, 40 mass % of NiO and 20 mass % of $SiO_2.Al_2O_3$ was obtained in the same manner as in Example 9, except that in Example 9, 225.1 g of nickel sulfate hexahydrate and 213.0 g of copper sulfate pentahydrate were used. The same operation as in Example 1 was carried out, except that the above desulfurizing agent B was charged in place of the desulfurizing agent B containing Ni and Cu prepared in Example 1. The performance test result of the desulfurizing agent is shown in Table 1.

Example 13

A desulfurizing agent B containing 80 mass % of NiO and 20 mass % of $SiO_2.Al_2O_3$ was obtained in the same manner as in Example 9, except that in Example 9, 450.1 g of nickel sulfate hexahydrate was used without using copper sulfate pentahydrate. The same operation as in Example 1 was carried out, except that the above desulfurizing agent B was charged in place of the desulfurizing agent B containing Ni and Cu prepared in Example 1. The performance test result of the desulfurizing agent is shown in Table 1.

COMPARATIVE EXAMPLE 1

The same operation as in Example 1 was carried out, except that in Example 1, 1.0 $cm^3$ of only the desulfurizing agent A was charged. The performance test result of the desulfurizing agent is shown in Table 1.

COMPARATIVE EXAMPLE 2

The same operation as in Example 1 was carried out, except that in Example 1, 1.0 $cm^3$ of only the desulfurizing agent B was charged. The performance test result of the desulfurizing agent is shown in Table 1.

TABLE 1

| | Effluent time (h) exceeding 0.07 weight ppm (0.1 vol ppm) | | | |
|---|---|---|---|---|
| | COS | DMS | TBM | DMDS |
| Example 1 | 6 | 11 | >15 | 15 |
| Example 2 | 2 | 6 | 14 | 10 |
| Example 3 | 3 | 7 | >15 | 15 |
| Example 4 | 4 | 9 | >15 | 11 |
| Example 5 | 5 | 10 | >15 | 15 |
| Example 6 | 5 | 9 | >15 | 15 |
| Example 7 | 7 | 11 | >15 | 15 |
| Example 8 | 6 | 11 | >15 | 15 |
| Example 9 | 7 | 11 | >15 | 15 |
| Example 10 | 7 | 11 | >15 | 15 |
| Example 11 | 7 | 11 | >15 | 15 |
| Example 12 | 3 | 6 | >15 | 10 |
| Example 13 | 5 | 8 | >15 | 14 |
| Comparative Example 1 | 0 | 11 | >15 | 9 |
| Comparative Example 2 | 1 | 0 | >15 | 3 |

As can be found from the results shown in Table 1, combined use of two kinds of the desulfurizing agents (Examples 1 to 4) has made it possible to desulfurize all sulfur compounds over a long period of time as compared with the cases where one kind of the respective desulfurizing agents is used alone (Comparative Examples 1 and 2).

Example 14

The desulfurizing agent A prepared in Example 1 was molded to 0.5 to 1 mm, and 1 $cm^3$ of the desulfurizing agent A was charged into a desulfurizing tube having an inner diameter of 9 mm to carry out the following performance test of the desulfurizing agent.
<Performance Test of the Desulfurizing Agent>

A temperature of the desulfurizing agent was set to 20° C., and propane gas A having a composition shown in Table 2 was allowed to flow on the conditions of atmospheric pressure and a GHSV (gas hourly space velocity) of 60,000 $h^{-1}$.

The concentrations of the respective sulfur compounds contained in the gas in the outlet of the desulfurizing tube were measured by SCD gas chromatography. Time in which the sulfur contents exceeding 0.07 weight ppm (0.1 vol ppm) were detected was shown in Table 3.

Example 15

A desulfurizing agent A was prepared in the same manner as in Example 14, except that in Example 6, Y type zeolite (TSZ-320NAA, manufactured by Tosoh Corp.) was substituted for β type zeolite (HSZ-930NHA, manufactured by Tosoh Corp.), and the performance test of the desulfurizing agent was carried out in the same manner as in Example 14. The result thereof is shown in Table 3.

Example 16

A desulfurizing agent A was prepared in the same manner as in Example 14, except that in Example 6, 13× type zeolite (BX powder, manufactured by Union Showa Co., Ltd.) was substituted for β type zeolite (HSZ-930NHA, manufactured by Tosoh Corp.), and the performance test of the desulfurizing agent was carried out in the same manner as in Example 14. The result thereof is shown in Table 3.

Example 17

A desulfurizing agent A was prepared in the same manner as in Example 14, except that in Example 14, 8.3 g of copper (II) nitrate trihydrate (extra pure grade, manufactured by Wako Pure Chemical Industries, Ltd.) was substituted for 3.5 g of silver nitrate (extra pure grade, manufactured by Wako Pure Chemical Industries, Ltd.), and the performance test of the desulfurizing agent was carried out in the same manner as in Example 14. The result thereof is own in Table 3.

COMPARATIVE EXAMPLES 3 TO 6

Comparative Examples 3 to 6 were carried out in the same manner, except that in the performance test of the desulfurizing agent in each of Examples 14 to 17, propane gas B having a composition shown in Table 2 described below was substituted for propane gas A. The results thereof are shown in Table 3.

TABLE 2

| Raw material LPG | | LPG-A | LPG-B |
|---|---|---|---|
| Composition (mol %) | $C_2H_6$ | 0.0 | 0.6 |
| | $C_3H_8$ | 98.5 | 97.1 |
| | $C_3H_6$ | 0.0 | 0.3 |
| | i-$C_4H_{10}$ | 1.4 | 1.8 |
| | n-$C_4H_{10}$ | 0.1 | 0.2 |
| | $C_4H_8$ | 0.0 | 0.0 |
| | $C_5$ | 0.0 | 0.0 |
| | $C_6+$ | 0.0 | 0.0 |
| Total sulfur content (wt ppm) | | 6.1 | 5.7 |
| | $H_2S$ | 0.0 | 0.0 |
| | COS | 0.0 | 0.2 |
| | RSH | 0.8 | 0.6 |
| | RSR | 0.6 | 0.9 |
| | RSSR | 4.5 | 3.7 |
| | Others | 0.2 | 0.3 |

TABLE 3

| | Effluent time (h) exceeding 0.07 weight ppm (0.1 vol ppm) |
|---|---|
| Example 14 | 31 |
| Example 15 | 27 |
| Example 16 | 26 |
| Example 17 | 18 |
| Comparative Example 3 | 2 |
| Comparative Example 4 | 1 |
| Comparative Example 5 | 3 |
| Comparative Example 6 | 2 |

INDUSTRIAL APPLICABILITY

According to the method of the present invention, combined use of two kinds of the desulfurizing agents having different desulfurizing performances and use of a raw material gas having a low concentration of carbonyl sulfide make it possible to efficiently remove all of sulfur compounds contained in a hydrocarbon-containing gas to a low concentration even at a room temperature.

Further, hydrogen for a fuel cell can economically advantageously be produced by subjecting the desulfurization-treated hydrocarbon-containing gas obtained by the method described above to reforming treatment.

What is claimed is:

1. A method for removing sulfur compounds contained in a hydrocarbon-containing gas comprising feeding a hydrocarbon-containing gas to a desulfurizing bed to remove sulfur compounds contained in the hydrocarbon-containing gas, wherein the desulfurizing bed comprises:
    a desulfurizing agent A comprising at least one metal component selected from the group consisting of Ag, Cu, Ni, Zn, Mn, Fe, Co, an alkali metal, an alkaline earth metal and a rare earth metal carried on a zeolite; and
    a desulfurizing agent B comprising at least one selected from the group consisting of cerium oxide and a metal component-carried on a porous inorganic oxide,
wherein
    the metal component-carried on a porous inorganic oxide is one selected from the group consisting of Ag, Cu, Ni, Zn, Mn, Fe, Co, Al, Si, an alkali metal, an alkaline earth metal and a rare earth metal, and
    the porous inorganic oxide is at least one selected from the group consisting of alumina, silica, silica-alumina and cerium oxide.

2. The method for removing sulfur compounds contained in a hydrocarbon-containing gas as described in claim 1, wherein
    the desulfurizing agent A has a higher desulfurizing performance to sulfides and disulfides than that of the desulfurizing agent B, and
    the desulfurizing agent B has a higher desulfurizing performance to carbonyl sulfide than that of the desulfurizing agent A.

3. The method for removing sulfur compounds contained in a hydrocarbon-containing gas as described in claim 1, wherein a volume ratio of the desulfurizing agent A to the desulfurizing agent B in the desulfurizing bed is 0.1:0.9 to 0.9:0.1.

4. The method for removing sulfur compounds contained in a hydrocarbon-containing gas as described claim 1, wherein zeolite in the desulfurizing agent A has a beta (BEA) and/or faujasite (FAU) structure.

5. The method for removing sulfur compounds contained in a hydrocarbon-containing gas as described claim 1, wherein a temperature of the desulfurizing bed is −20 to 100° C.

6. A hydrocarbon-containing gas for a fuel cell obtained according to the method of claim 1, wherein a concentration of carbonyl sulfide is 0.1 weight ppm or less.

7. The hydrocarbon-containing gas for a fuel cell as described in claim 6, wherein the hydrocarbon-containing gas for a fuel cell is at least one selected from natural gas, city gas, LPG, a naphtha fraction and dimethyl ether.

8. A method for removing sulfur compounds contained in a hydrocarbon-containing gas, wherein a desulfurizing agent comprising at least zeolite is used to remove sulfur compounds contained in the raw material hydrocarbon-containing gas for a fuel cell as described in claim 6.

9. A method to produce hydrogen for a fuel cell, comprising:
    removing sulfur compounds contained in a hydrocarbon-containing gas by the method as described in claim 1, and
    then contacting the hydrocarbon-containing gas from which the sulfur compounds have been removed with one selected from the group consisting of a partial oxidation reforming catalyst, an autothermal reforming catalyst and a steam reforming catalyst.

10. The method for producing hydrogen for a fuel cell as described in claim 9, wherein the partial oxidation reforming catalyst, the autothermal reforming catalyst or the steam reforming catalyst is a ruthenium base or nickel base catalyst.

11. A method for producing hydrogen for a fuel cell, wherein the hydrocarbon-containing gas as described in claim 6 is a raw material.

12. A method for producing hydrogen for a fuel cell, comprising:
removing the sulfur compounds contained in the hydrocarbon-containing gas as described in claim 6, and then
contacting the hydrocarbon-containing gas from which the sulfur compounds have been removed with one selected from the group consisting of a partial oxidation reforming catalyst, an autothermal reforming catalyst and a steam reforming catalyst.

13. The method for producing hydrogen for a fuel cell as described in claim 12, wherein the partial oxidation reforming catalyst, the autothermal reforming catalyst or the steam reforming catalyst is a ruthenium base or nickel base catalyst.

14. The method for removing sulfur compounds contained in a hydrocarbon-containing gas as described in claim 1, wherein
the desulfurizing agent A comprises zeolite having a beta (BEA) and/or faujasite (FAU) structure and at least one metal component selected from the group consisting of Ag and Cu, and
the desulfurizing agent B comprises at least one selected from the group consisting of cerium oxide and a metal component-carried on a porous inorganic oxide, wherein
the metal component is at least one selected from the group consisting of Ag, Cu and Ni, and
the porous inorganic oxide is at least one selected from the group consisting of alumina, silica-alumina and cerium oxide.

* * * * *